United States Patent [19]

McClure et al.

[11] Patent Number: 5,022,333
[45] Date of Patent: Jun. 11, 1991

[54] UNIVERSAL PRESS WHEEL ARM ASSEMBLY

[75] Inventors: J. Michael McClure; Eric Johnson, both of Salina, Kans.

[73] Assignee: Great Plains Manufacturing Incorporated, Salina, Kans.

[21] Appl. No.: 411,869

[22] Filed: Sep. 25, 1989

[51] Int. Cl.$^5$ .......................... A01C 5/06; A01B 35/28; A01B 29/06; B60B 37/10
[52] U.S. Cl. ..................... 111/194; 111/136; 172/519; 301/111; 301/114
[58] Field of Search ............... 111/135, 136, 137, 163, 111/164, 165, 167, 191–196; 301/111, 114, 119, 120, 121, 126, 128, 1; 172/519, 535, 536, 538, 539, 604

[56] References Cited

U.S. PATENT DOCUMENTS

| | | | |
|---|---|---|---|
| 393,390 | 11/1888 | Patric | 111/194 |
| 1,165,735 | 12/1915 | Wentz | 172/538 X |
| 2,682,430 | 6/1954 | Brubaker | 301/1 |
| 2,685,478 | 8/1954 | Booth | 301/1 |
| 3,507,233 | 4/1970 | Greig et al. | 111/84 X |
| 3,568,613 | 3/1971 | Lange | 111/194 |
| 3,886,875 | 6/1976 | Ernst | 111/194 |
| 4,273,057 | 6/1981 | Pollard | 111/136 |
| 4,404,918 | 9/1983 | Whalen et al. | 111/196 |
| 4,570,554 | 2/1986 | Clark | 111/196 |
| 4,714,033 | 12/1987 | Neumeyer | 111/194 |
| 4,828,328 | 5/1989 | Bowman | 301/111 |

FOREIGN PATENT DOCUMENTS 117745 9/1984 European Pat. Off. ............ 111/196
864109 3/1961 United Kingdom ................ 111/191

OTHER PUBLICATIONS

Photograph, marked Exhibit A, is a prior art press wheel arm constructed for mounting a first press wheel on one location.
Photograph, marked Exhibit B, is of the same press wheel arm as shown in Exhibit A but with a second press wheel movable at a second location on the arm.
Blueprint, marked as Exhibit C, entitled Combination P. W. Arm Weldment, dated 01/07/88, of the press wheel arm shown in Exhibits A and B.

Primary Examiner—Danton D. DeMille
Attorney, Agent, or Firm—Hovey, Williams, Timmons & Collins

[57] ABSTRACT

A towable, furrow opening seed planting assembly includes a mobile frame and a planting unit, the planting unit including a ground engaging opener, a seed depositing apparatus and a press wheel for covering the deposited seed with soil. A variety of different press wheels may be substituted through the use of adapters removably mounted on a universal press wheel arm whereby press wheels having different widths may be maintained in proper alignment with the furrow created by the opener for ensuring proper soil coverage and contact with the deposited seed.

1 Claim, 2 Drawing Sheets

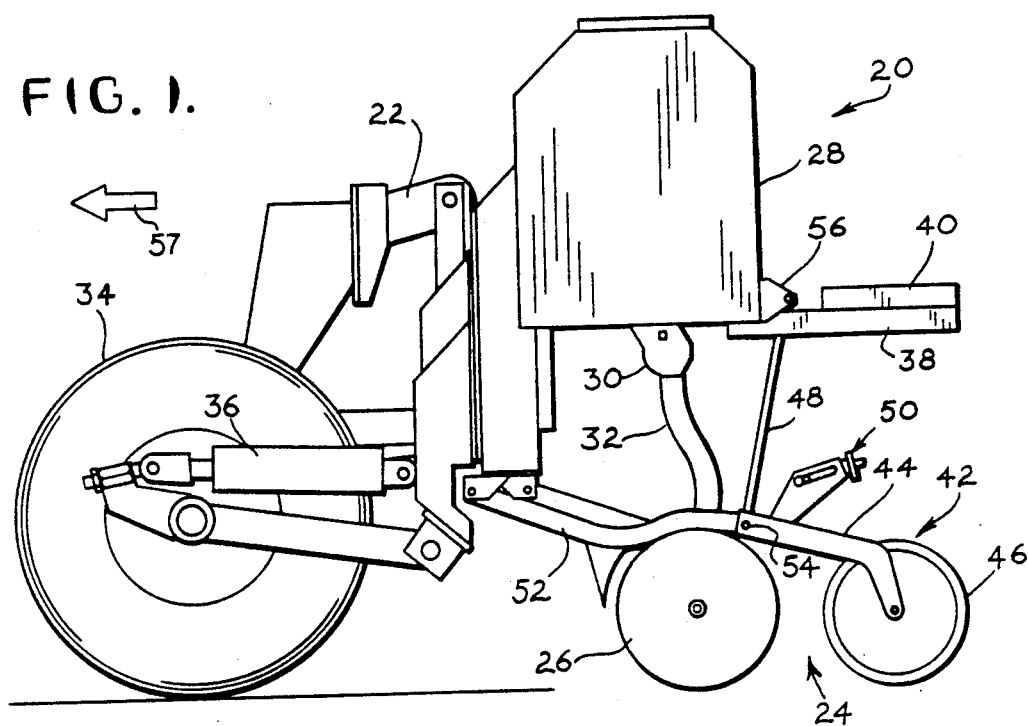
FIG. 1.
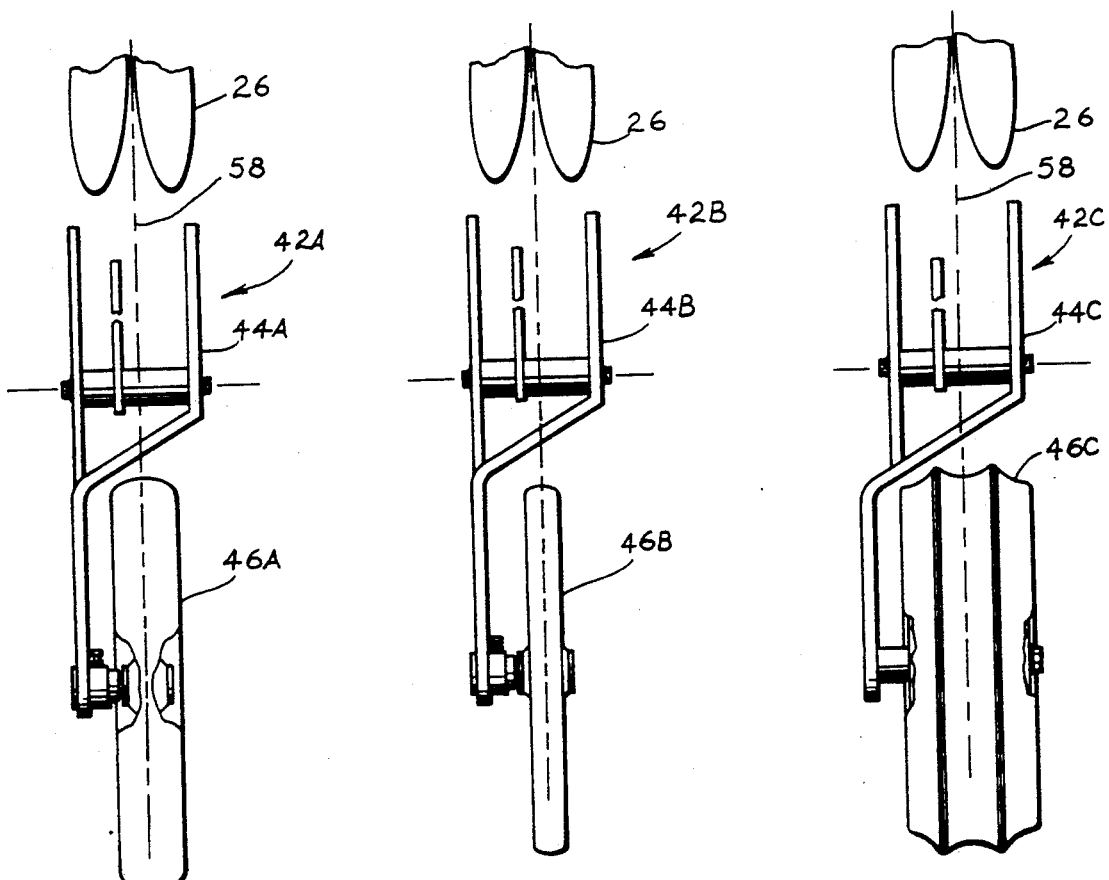
FIG. 2.
PRIOR ART
FIG. 3.
PRIOR ART
FIG. 4.
PRIOR ART

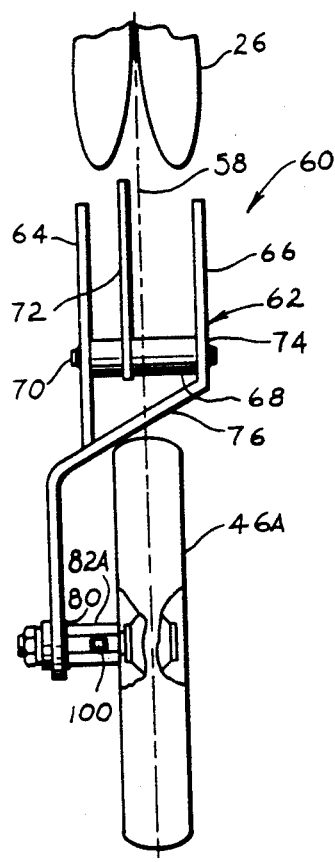
FIG. 5.
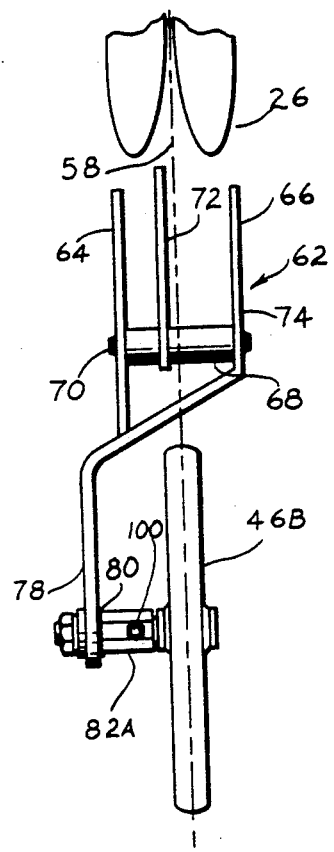
FIG. 6.
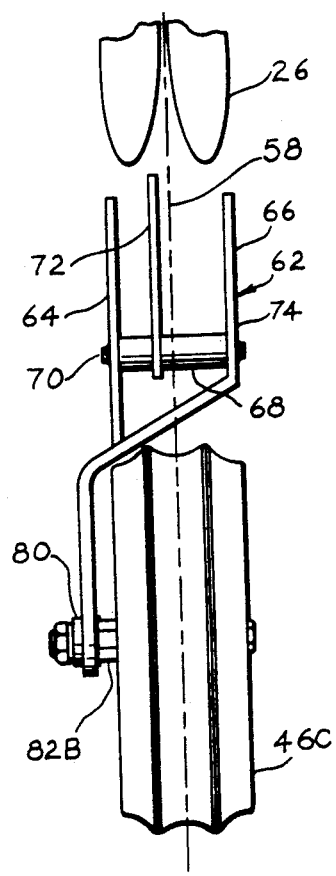
FIG. 7.
FIG. 8.
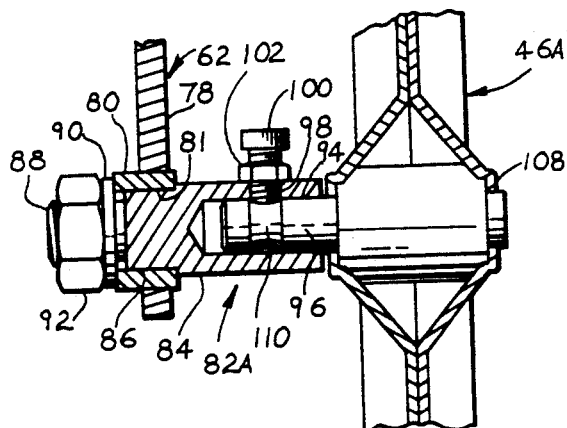
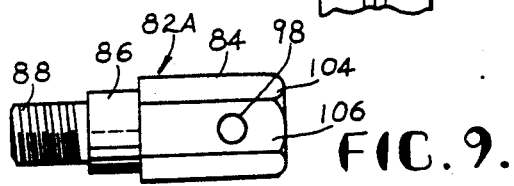
FIG. 9.
FIG. 10.
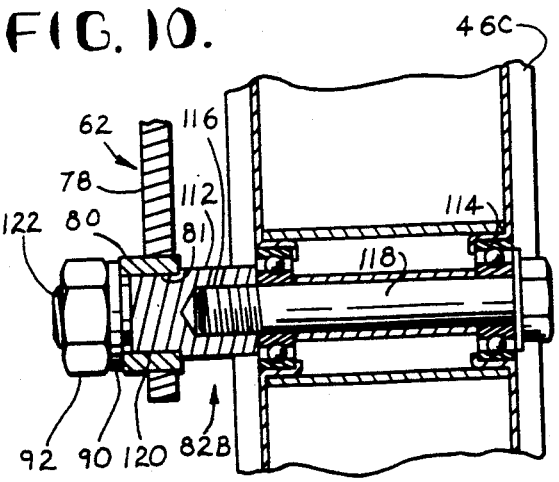
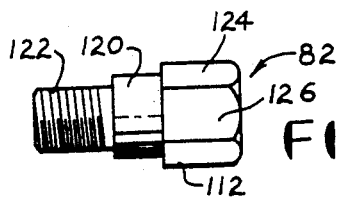
FIG. 11.

UNIVERSAL PRESS WHEEL ARM ASSEMBLY

BACKGROUND OF THE INVENTION

1. Field of the Invention

The present invention relates to farm implements used for row seeding by forming spaced furrows, depositing seed into the furrows, and pressing dirt into the furrows and onto the deposited seed by a press wheel. It is particularly concerned with a universal press wheel arm assembly which is adapted to receive press wheels of various width and configuration in precise alignment whereby the center line of the normally vertically oriented press wheel is maintained in precise alignment over the deposited seed.

2. Description of the Prior Art

Present day row seeders conventionally employ a trailing arm which is provided with a press wheel for pressing the soil displaced in creating a seed receiving furrow. After the seed has been deposited in the furrow, the press wheel presses soil over or beside the seed to ensure germination contact between the soil and the seed. Various press wheels may be employed depending upon the particular seed sown by the farmer. For example, when planting soybeans, it may be desired to employ a double rib design press wheel, while when planting wheat, it may be desirable to use a single crown wheel. Because different wheels have different widths, it has heretofore been necessary to employ different arms for carrying the press wheels in order to ensure that the press wheel is correctly aligned in trailing relationship to follow along the center line of the furrow. The need to employ separate arm and wheel assemblies has heretofore created an increased expense for the farmer and difficulties in connection with mounting different arms when a farmer desired to have the ability to plant more than one type of crop.

SUMMARY OF THE PRESENT INVENTION

The present invention overcomes these problems by employing a universal press wheel arm assembly capable of maintaining various widths and configurations of interchaneable press wheels in proper alignment along the imaginary center line of the furrow, notwithstanding the different widths, diameters and configurations of the wheels. In this manner, a single trailing arm assembly may be employed to selectively mount a variety of different press wheels, by providing a plurality of different adapters, each adapter corresponding to a respective configuration of press wheel. Importantly, this invention permits the press wheels substituted on the farm to be positioned in proper alignment with respect to the furrow.

The adapters may be removably mounted to the universal press wheel arm whereby various press wheels may be substituted without removing the adapters from the press wheels. Each of the adapters corresponds to a respective press wheel whereby the center line of each press wheel is maintained at a uniform lateral distance from the press wheel arm and in vertical alignment with the center line of the furrow.

BRIEF DESCRIPTION OF THE DRAWINGS

FIG. 1 is an elevational view showing one side of a furrow opening and seeding assembly in accordance with the present invention;

FIG. 2 is a fragmentary top plan view showing a prior art press wheel arm assembly with portions thereof removed for clarity and showing the press wheel in alignment behind a soil opening implement;

FIG. 3 is a fragmentary top plan view of a second embodiment of a prior art press wheel arm assembly with portions cut away for clarity and mounting a different sized press wheel from that shown in FIG. 2;

FIG. 4 is a fragmentary top plan view of a third embodiment of a prior art press wheel arm assembly with portions cut away for clarity and showing a double ribbed design press wheel rotatably mounted on a press wheel arm assembly and in alignment in trailing relationship to a furrow opening implement;

FIG. 5 is a view similar to FIG. 2, showing a universal press wheel arm assembly in accordance with the present invention and mounting an adapter for maintaining the press wheel in alignment in trailing relationship to a furrow opening implement;

FIG. 6 is a view similar to FIG. 3, showing a second size of press wheel mounted to the universal press wheel arm assembly of the present invention having an adapter for maintaining the center line of the press wheel in alignment trailing a furrow opening implement;

FIG. 7 is a view similar to FIG. 4 showing a third size of press wheel mounted to the universal press wheel arm assembly of the present invention and mounting an adapter for maintaining a double rib press wheel in alignment behind a furrow opening implement;

FIG. 8 is an enlarged, fragmentary vertical cross-sectional view through the adapter and wheel shown in FIG. 6;

FIG. 9 is an enlarged, top plan view of the adapter forming a part of the press wheel arm assembly shown in FIG. 6;

FIG. 10 is an enlarged, fragmentary vertical cross-sectional view of the press wheel arm assembly shown in FIG. 7; and FIG. 11 is an enlarged top plan view of the adapter incorporated in the press wheel arm assembly shown in FIG. 7.

DESCRIPTION OF THE PREFERRED EMBODIMENTS

It is to be contemplated that the universal press wheel arm assembly of FIGS. 1 and as shown in FIGS. 5-11 are to be used with drills, seeders, planters or comparable farm implements provided with towable frames partially from which such assemblies are to be suspended. Each implement will be equipped with a series of laterally separated row planting or seeding units which, in turn, will have their own press wheel arm assemblies and other components for opening a furrow and depositing seeds.

Accordingly, the seed planting implement 20 of FIG. 1 broadly includes a mobile frame 22 and one or more planting units 24. Each planting unit 24 includes a ground-engaging soil opener 26 such as a coulter, disc or the like, a seedbox 28 (which may be shared in common by several units) for receiving and holding a quantity of seeds to be deposited in the soil, a metering unit 30 for individually and intermittently discharging seeds from the seedbox 28, and a conduit 32 for downwardly conveying seeds into a furrow created by the opener 26. The opener 26 may, for example, be of the double disc variety in order to create a V-shaped furrow in the soil having an imaginary center line along line 58.

Frame 22 includes suitable carriage members for supporting the seed planting units 24 in relation to the soil surface including gauge wheels 34 and a height adjustment mechanism 36 for raising and lowering the planting unit 24. Mobile frame 22 also serves as a point of attachment whereby multiple seed planting units 24 may be interconnected. Extending rearwardly from the seedbox 28 is beam 38 upon which may be mounted a walkboard 40 for use by a farmer in filling the seedbox 28.

Each planting unit 24 also includes a press wheel arm assembly 42 which broadly includes press wheel arm 44, press wheel 46, downpressure spring and rod unit 48 and depth adjuster 50. Press wheel arm assembly 42 is pivotally connected to an opener support frame 52 by pivot pin 54, which also pivotally connects the lower end of downpressure spring and rod unit 48. Downpressure spring and rod unit 48 is connected at its upper end by spring rod guide 56 to the box 28 or its supporting structure.

The seed planting implement 20 shown in FIG. 1 is generally adapted to be towed in the direction indicated by the arrow 57 shown therewith, whereby press wheel 46 follows in trailing relationship to the opener 26.

FIGS. 2, 3 and 4 show prior art press wheel arm assemblies 42A, 42B and 42C respectively in relationship to the double disc ground-engaging opener 26. As shown in FIGS. 2, 3 and 4, opener 26 prepares a seed-receiving furrow in the soil along the imaginary line of travel 58, as defined by the path of travel of the opener. Line 58 thereby defines the center line of the furrow and preferably the path of travel of the trailing press wheel 46. In the assembly 42A of FIG. 2, a press wheel 46A of a single crown design is mounted to a corresponding press wheel arm 44A, whereby the imaginary line of travel 58 is congruent with both the center line of a furrow created by opener 26 and a vertical plane bisecting press wheel 46A. Thus, the plane bisecting press wheel 46A extends along the line of travel and places the seed covering press wheel 46A directly over the furrow to cover the deposited seed with soil displaced by the opener 26.

In the assembly 42B of FIG. 3, arm 44B is identical to arm 44A but is used with a press wheel 46B having a narrower outermost tire portion than wheel 46A, although utilizing the same hub and axle configuration. In the assembly 42C of FIG. 4, a different press wheel arm 44C has been necessary to accommodate a wider press wheel, such as double rib press wheel 46C, in order to maintain the press wheel 46C in proper alignment with respect to the center of the furrow and the line of travel 58 of the opener 26. Thus, it has heretofore been necessary for separate press wheel arms to be employed to accommodate different press wheels.

The universal press wheel arm assembly 60 in accordance with the present invention is shown in FIGS. 5, 6 and 7. Universal press wheel arm 62 is adapted to mount various press wheels 46A, 46B or 46C thereon so that the vertical plane extending in the direction of travel and bisecting the press wheels 46A, 46B and 46C is substantially congruent with the imaginary center line 58 of the furrow. This is accomplished in each instance by an adapter which is removably mounted to the press wheel arm 62 and extends transversely to the imaginary line of travel 58 and the press wheel arm 62 to place the corresponding press wheel 46 in appropriate spaced relationship over the center line of the furrow.

As shown in FIGS. 5 through 7, the universal press wheel arm 62 is generally Y-shaped and includes support member 64, trailing member 66, cross tube 68 secured to support member 64 and trailing member 66 by cross pin 70 welded to arm 62, and a height adjustment arm 72 which is connected to depth adjuster 50 (FIG. 1) and its end opposite cross tube 68. As may be seen from FIGS. 5 through 7, a trailing member 66 includes a forward portion 74, a diagonally rearwardly extending portion 76, and a trailing press wheel carrying portion 78 integral with diagonal portion 76 and forward portion 74 normally trailing behind forward portion 74 and diagonal portion 76. Trailing portion 78 lies in laterally offset, parallel relationship with forward portion 74 and extends parallel to line 58. A collar 80 extends transversely through press wheel carrying portion 78 and presents a hole 81 therethrough for receiving an adapter as shown in FIGS. 5–7. The collar 80 is normally welded to the trailing member 78, and the universal press wheel arm 62 hereof is preferably rigid and presents a single, fixed unit whereby the adapter 82 may be mounted at a common location on the arm a fixed distance rearwardly of the opener 26.

As may be seen in FIGS. 5, 6 and 7, the diagonal portion 76 of press wheel arm 62 is sufficient in angle and length to displace press wheel carrying portion 78 laterally a sufficient distance to accommodate a variety of press wheels 46A, 46B or 46C. Thus, as shown in FIGS. 5, 6 and 7, the universal press wheel arm 62 presents a clearance between the arm 62 and any of a variety of press wheels 46A, 46B or 46C as may be used in normal applications.

As shown in FIGS. 5–7, an appropriate adapter 82A or 82B is employed to maintain the selected press wheel in proper alignment with the center line 58 of the furrow into which the seed is deposited. Press wheels 46A and 46B have a common hub width but present different press wheel widths, and thus use the same adapter 82A. On the other hand, press wheel 46C requires an alternate adapter 82B in order to be in proper alignment with the center line 58 of the furrow into which the seed is deposited.

The specific adapters and their application to the press wheel arm 62 may be more clearly seen in FIGS. 8 and 10. Adapter 82A is shown in FIGS. 8 and 9 and includes a cylindrical body 84, a shoulder region 86 and a threaded rod 88 oriented through collar 80 and adapted to receive a washer 90 and hex nut 92 thereon. Body 84 is provided with an aperture 94 axially extending part way therethrough and transversely oriented with respect to press wheel carrying portion 78. Body 84 is provided with an aperture extending part way therethough and extending axially through the body and normally oriented transversely to press wheel carrying portion 78. Aperture 94 is sized to receive axle 96 corresponding to press wheel 46A. As shown in FIG. 8, body 84 also defines a threaded bore 98 extending transversely to and into aperture 94 for receiving a set screw 100 therein. A lock nut 102 is provided for securing set screw 100 in the desired position as may be seen in FIG. 8. Body 84 in FIG. 9 is provided with an external surface 104 having a plurality of flat sides therearound 106, and preferably is hexagonal in cross section.

Returning to FIG. 8, axle 96 extends through press wheel 46A, which includes a hub 108 rotatable about axle 96. Axle 96 is provided with a grooved portion 110 complementary to the end of set screw 100 whereby axle 96 may be maintained in fixed relationship to adapter 82A and axle 96 may be prevented from separating from adapter 82A.

Adapter 82B is shown in FIGS. 10 and 11, and as shown is particularly suited for mounting a double rib design press wheel. Adapter 82B includes a body portion 112 somewhat reduced in length compared to body portion 84 of adapter 82A in order to accommodate the wider hub 114 of press wheel 46C. However, body 112 is provided with a threaded aperture 116 extending axially partway into adapter 82B and is not provided with the transversely extending threaded bore of adapter 82A. Threaded aperture 116 is adapted to receive axle 118 in threaded engagement therewith while permitting press wheel 46C to rotate around the centerline of the axle 118. Adapter 82B is also provided with shoulder portion 120 and threaded rod portion 122 whereby shoulder portion 120 may cooperatively fit within collar 80 and threaded portion 122 may extend transversely through collar 80 for securement by washer 90 and hex nut 92, as shown in FIG. 8 and FIG. 10. As may be seen in FIG. 11, body 112 of adapter 82B is provided with an exterior surface 124 having a plurality of flat sides 126 which present a hexagonal cross section for holding by a wrench.

In operation, the farmer operates the seed planting assembly behind a tractor whereby openers 26 create furrows in the soil having an imaginary center line along line 58. Metering unit 30 intermittently deposits seeds into the furrow prepared by the opener. A press wheel, such as press wheel 46A, trails behind each opener 26 to cover the deposited seed with soil displaced by the opener 26, the press wheel serving to not only cover the seed with soil but also to create sufficient germination contact between the soil and the seed.

In the particular application shown in FIG. 5, press wheel 46A might be used to press soil over sowed wheat seeds. When the farmer desired to plant a different crop, it is only necessary to substitute press wheels without the need for replacing the entire press wheel arm assembly 42A. For example, if the farmer desires to plant soybeans in a "no till" environment, reduced width press wheel 46B might be employed as shown in FIG. 6. To substitute different press wheels, the farmer need not change the entire press wheel arm assembly 42. Rather, the substitution requires only that set screw 100 be loosened and axle 96 removed from aperture 94 of adapter 82A. Thereafter, press wheel 46B may be mounted on adapter 82A and set screw 100 tightened to maintain axle 96 in mounted relationship to adapter 82A. The substituted press wheel 46B may then be used as desired by the farmer.

On the other hand, the farmer may desire to employ a different press wheel in a different environment such as a conventional seed bed of soybean seeds. In this particular environment, it may be more desirable to use the double ribbed design press wheel 46C as shown in FIG. 7. Because the double rib press wheel 46C is wider than press wheels 46A and 46B and employs a wider hub 114 than hub 108 of either press wheel 46A or 46B, a different adapter 82B must be employed in order to maintain the plane bisecting press wheel 46C congruent with and in alignment with imaginary line 58. In this circumstance, adapter 82A and press wheel 46B may be removed by simply removing hex nut 92 and washer 90 from threaded portion 88 of adapter 82A. The adapter 82A may then be removed from the press wheel arm 62 and adapter 82B substituted therefor by inserting shoulder portion 120 and threaded rod portion 122 through collar 80 and installing washer 90 and tightening hex nut 92 thereon. Press wheel 46C may then be mounted by threading axle 118 into threaded aperture 116 as shown in FIG. 10.

It may be understood that a variety of different press wheels of various widths and configurations may be used with corresponding adapters, whereby a respective press wheel 46 and adapter 82 may be substituted on universal press wheel arm 62 to maintain any of a variety of different press wheels in proper seed covering alignment for covering the deposited seed with soil. From the foregoing, it may be apparent that while a single adapter 82 may be useful with several different press wheels 46, substitution of a press wheel 46 alone or the press wheel adapter may be accomplished without the necessity of employing multiple press wheel arms 62 for each different press wheel 46 which may be used in a variety of different environments.

We claim:

1. In combination:
   a frame;
   at least one planting unit secured to the frame for movement therewith, the planting unit including a ground-engaging opener for preparing a seed-receiving furrow in the soil along an imaginary line defined by the path of travel of the opener, and means for intermittently depositing seeds in the furrow prepared by the opener;
   an arm displaced from the opener in a direction along the path of travel of the opener;
   a first press wheel having an axis of rotation and presenting a first width in the direction of the axis of rotation, the first width defining a first center plane bisecting the first width;
   a first adapter for use in mounting the first press wheel to the arm in preselected spaced relationship thereto with the first center plane aligned with the imaginary line defined by the path of travel of the opener;
   a second press wheel having an axis of rotation and presenting a second width different from the first width in the direction of the axis of rotation, the second width defining a second center plane bisecting the second width;
   a second adapter for use in mounting the second press wheel to the arm in preselected space relationship thereto with the second center plane aligned with the imaginary line defined by the path of travel of the opener;
   the first adapter including a first elongated body having first and second axial ends, first connection means located adjacent the first axial end of the first body for releasably connecting the first body to the arm, and first mounting means located adjacent the second axial end of the first body for releasably mounting the first press wheel on the first body, the connection means and mounting means being separated from one another by a first predetermined distance adapted to position the first press wheel with the first center plane substantially coplanar with the imaginary line when the first press wheel and first adapter are supported on the arm,
   the second adapter including a second elongated body having first and second axial ends, second connection means located adjacent the first axial end for releasably connecting the second body to the arm, and second mounting means located adjacent the second axial end for releasably mounting the second press wheel on the second body, the connection means and mounting means being separated from one another by a second predetermined distance different from the first predetermined distance and adapted to position the second press wheel with the first center plane of the second press wheel substantially co-planar with the imaginary line defined by the path of travel of the opener when the second press wheel and second adapter are supported on the arm, whereby the first press wheel and adapter, and the second press wheel and adapter are selectively positionable on the arm in place of one another.

* * * * *